United States Patent
Boschetti et al.

(10) Patent No.: US 11,226,296 B2
(45) Date of Patent: Jan. 18, 2022

(54) TUNNEL COMPUTERISED TOMOGRAPHIC SCANNER AND METHOD FOR ACQUIRING IMAGES FROM A SCINTILLATOR OF A TUNNEL COMPUTERISED TOMOGRAPHY SCANNER

(71) Applicant: MICROTEC S.R.L., Bressanone (IT)

(72) Inventors: Marco Boschetti, Levico Terme (IT); Enrico Ursella, Mestre (IT)

(73) Assignee: MICROTEC S.R.L., Bressanone (IT)

( * ) Notice: Subject to any disclaimer, the term of this patent is extended or adjusted under 35 U.S.C. 154(b) by 0 days.

(21) Appl. No.: 17/259,869

(22) PCT Filed: Jan. 31, 2020

(86) PCT No.: PCT/IB2020/050797
§ 371 (c)(1),
(2) Date: Jan. 12, 2021

(87) PCT Pub. No.: WO2020/161581
PCT Pub. Date: Aug. 13, 2020

(65) Prior Publication Data
US 2021/0278352 A1  Sep. 9, 2021

(30) Foreign Application Priority Data
Feb. 4, 2019 (EP) .................................... 19155347

(51) Int. Cl.
*G01N 23/046* (2018.01)

(52) U.S. Cl.
CPC ...... *G01N 23/046* (2013.01); *G01N 2223/3303* (2013.01); *G01N 2223/419* (2013.01); *G01N 2223/505* (2013.01)

(58) Field of Classification Search
CPC ......... G01N 23/046; G01N 2223/3303; G01N 2223/419; G01N 2223/505; G01N 2223/417
See application file for complete search history.

(56) References Cited

U.S. PATENT DOCUMENTS 9,250,200 B1    2/2016  Grubsky et al.
9,279,890 B2 *  3/2016  Sugiyama ............... G01T 1/20
(Continued)

FOREIGN PATENT DOCUMENTS

EP    2669665    4/2020
RU    2071725    1/1997
(Continued)

OTHER PUBLICATIONS

Katsevich, A., "Theoretically Exact Filtered Backprojection-Type Inversion Algorithm For Spiral CT", SIAM Journal on Applied Mathematics, vol. 62, No. 6, 2002, pp. 2012-2026.

*Primary Examiner* — David P Porta
*Assistant Examiner* — Mamadou Faye
(74) *Attorney, Agent, or Firm* — Pearne & Gordon LLP

(57) ABSTRACT

A tunnel computerised tomographic scanner comprising a rotor (3), an X-ray emitter (7) mounted on the rotor (3), an X-ray detector (8) mounted on the rotor (3), on the opposite side of a detecting zone (4), the X-ray detector (8) comprising a scintillator (9) which has at least one emission face (10) from which the scintillator (9) emits light in the visible spectrum when it is struck by X-rays, and a plurality of video cameras (12) which are positioned in such a way that each of them frames at least one portion of the scintillator (9), for acquiring one after another second images, in the visible spectrum, of the respective portion of the scintillator (9), wherein, according to the method, at least two separate video cameras (12) substantially frame each zone of the emission face (10), and an electronic processing unit is
(Continued)

programmed to combine all of the second images obtained by the video cameras (12) and to obtain a first image of the emission face (10), to be used for the tomographic reconstruction of an object (6) which is placed in the detecting zone (4).

19 Claims, 3 Drawing Sheets

(56) References Cited

U.S. PATENT DOCUMENTS

| | | | |
|---|---|---|---|
| 2011/0058646 A1* | 3/2011 | Herranz | G01N 23/04 378/19 |
| 2014/0016753 A1 | 1/2014 | Sugiyama et al. | |
| 2015/0185165 A1 | 7/2015 | Sugiyama et al. | |
| 2017/0122886 A1 | 5/2017 | Sugiyama et al. | |
| 2019/0049596 A1 | 2/2019 | Behrendt et al. | |

FOREIGN PATENT DOCUMENTS

| | | |
|---|---|---|
| WO | 2017178300 A1 | 10/2017 |
| WO | 2018115325 A1 | 6/2018 |

* cited by examiner
TUNNEL COMPUTERISED TOMOGRAPHIC SCANNER AND METHOD FOR ACQUIRING IMAGES FROM A SCINTILLATOR OF A TUNNEL COMPUTERISED TOMOGRAPHY SCANNER This invention relates to a tunnel computerised tomographic scanner, as well as a method for acquiring images from a scintillator of a tunnel computerised tomography scanner.

As is known, regarding the technology of the X-ray detectors used in them, tomgraphic scanners are mainly divided into two families: tomographic scanners with linear sensors (which can be mono-line or multi-line) and tomographic scanners with panel sensors.

The tomographic scanners of the first family are chiefly used in the medical sector. Compared with those of the second family, they have lower resolution, but higher acquisition frequency.

In contrast, the tomographic scanners of the second family are often used in industry. Compared with those of the first family, as well as having higher resolution and lower acquisition frequency, they have a limited field of vision. Both types of sensors have a very high cost, which often accounts for more than half of the entire cost of a computerised tomographic scanner.

This invention has been developed with reference to tomographic scanners for industrial applications, in particular with reference to tunnel tomographic scanners, in which the tomographic inspection of the objects is carried out while the objects are continuously fed through a detecting zone of the tomographic scanner (in many cases with a relatively high feed speed).

Considering that in order to obtain a correct tomographic reconstruction of the internal structure of the objects, it is necessary to obtain X-ray images of the objects themselves from various angular positions, and at least for a 180° rotation about the object (the second 180° are symmetrical), and with a relatively small acquisition step, the main problem which arises in industrial applications is that of successfully making a tomographic scanner with a large acquisition surface, an acquisition frequency equal to that of multi-line systems but a much lower cost than that of prior art.

At present, all of the prior art sensors are based on the use of a scintillator material capable of converting the X-rays (X-photons) which strike it, into light photons in the visible spectrum. A panel consisting of multiple cells made of scintillator material is positioned in such a way as to intercept the X-rays which have passed through the detecting zone. That panel has an emission face from which the visible light photons are emitted, coupled to a panel of photodiodes (or other devices capable of converting light to an electrical). In particular, there is usually a photodiode for each cell of the scintillator panel.

The analogue electrical signals generated by the photodiodes are then converted to digital signals and conveyed towards a processing unit (usually a computer) for processing.

The most expensive component of the prior art detectors is the system for collecting high frequency data from a very large number of photodiodes.

In this context, the technical purpose which forms the basis of this invention is to provide a tunnel computerised tomographic scanner, and a method for acquiring images from a scintillator of a tunnel computerised tomographic scanner, which overcome the above-mentioned disadvantages.

In particular, the technical purpose of this invention it to provide a tunnel computerised tomographic scanner, and method for acquiring images from a scintillator of a tunnel computerised tomographic scanner, which use a large acquisition surface, with an acquisition frequency equal to prior art multi-line systems and a cost lower than the prior art ones.

The technical purpose and the aims indicated are substantially fulfilled by a tunnel computerised tomographic scanner and a method for acquiring images from a scintillator of a tunnel computerised tomographic scanner in accordance with what is described in the appended claims.

Further features and the advantages of this invention are more apparent in the detailed description of several preferred, non-limiting embodiment of a tunnel computerised tomographic scanner and a method for acquiring images from a scintillator of a tunnel computerised tomographic scanner, with reference to the accompanying drawings, in which.

Figure 1:
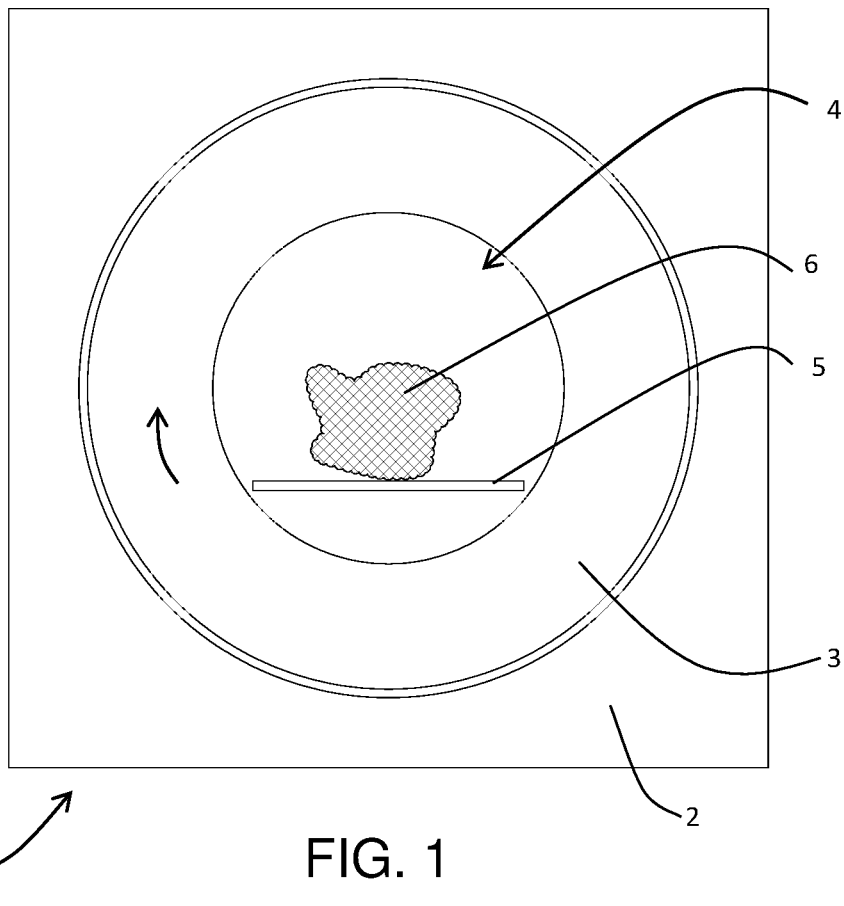
FIG. 1 is a schematic front view of a computerised tomographic scanner made in accordance with this invention.
Figure 2:
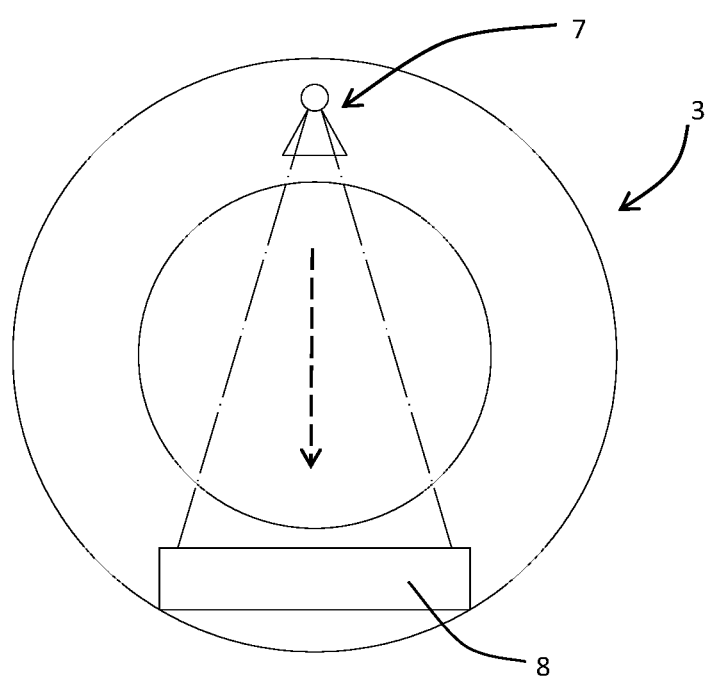
FIG. 2 is a schematic transparent front view of only the rotor of the tomographic scanner of FIG. 1.

With reference to the above-mentioned figures the numeral 1 denotes in its entirety a tunnel computerised tomographic scanner 1 according to this invention.

The tunnel computerised tomographic scanner 1 according to this invention comprises first a supporting structure 2, which acts as a stator, a rotor 3 supported by the supporting structure 2, and a motor (not illustrated) connected to the rotor 3 in order to drive its rotation, relative to the supporting structure 2, about an axis of rotation. Inside the rotor 3 there is a detecting zone 4 through which the axis of rotation passes.

Advantageously, in the preferred embodiments a conveying device 5 for conveying objects 6 (which may or may not be part of the tomographic scanner 1) is mounted through the detecting zone 4 for feeding an object 6 parallel to the axis of rotation, during rotation of the rotor 3 about the axis of rotation. Preferably, at least at the detecting zone 4, the conveying device 5 for conveying objects 6 is made of material which is not radiopaque.

The tomographic scanner 1 also comprises an X-ray emitter 7 and an X-ray detector 8 which are mounted on the rotor 3, on opposite sides of the detecting zone 4.

The X-ray emitter 7 may be of any type suitable for the purpose (known in themselves and therefore not described in detail).

In the known way, the X-ray detector 8 is able to convert the intensity of X-radiation which strikes it into an image in the visible spectrum, which represents a map of the density of the material through which the X-rays passed; it is an image which can typically be shown in greyscale in which the lighter shades correspond to lower density values and the darker shades correspond to higher density values. The image is also usually defined in each pixel as attenuation of the light intensity detected during the measurement compared with the no-load intensity detectable; that must be understood to also apply for the first images and the second images defined below.

An electronic processing unit (not illustrated) is then connected to the X-ray detector 8, and is programmed to combine first images acquired from the X-ray detector 8, in a plurality of separate angular positions of the rotor 3 around the axis of rotation, for reconstructing the three-dimensional structure of an object 6 placed in the detecting zone 4. In the context of this invention, the definition main image or first image refers to the overall image which represents the visible light emitted by the entire scintillator.

The X-ray detector 8 comprises at least one scintillator 9 which, in the known way, comprises a two-dimensional matrix of cells placed side by side, each of which comprises a scintillating material and is separated from the adjacent cells by thin walls made of X-ray shielding material.

The scintillator 9 defines at least one emission face 10, which corresponds to the part of its outer surface from which, when it is struck by X-rays (in the accompanying figures the beam of X-rays is represented by the dashed line with long dashes), the scintillator 9 emits the light in the visible spectrum which must be used to create the tomographic images.

Figure 5:
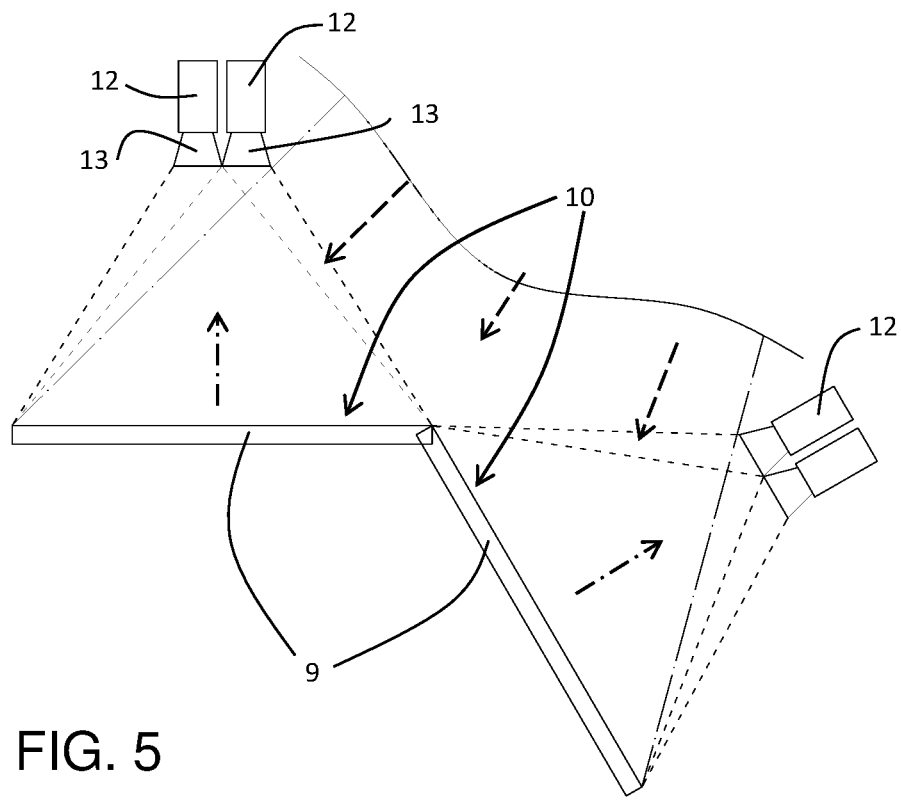
FIG. 5 is a schematic view of a third embodiment of an X-ray detector which is part of the tomographic scanner according to this invention.

Advantageously, both the entire scintillator 9 and its emission face 10 are flat, although they may be constituted of two or more parts positioned at an angle to each other (FIG. 5).

Figure 3:
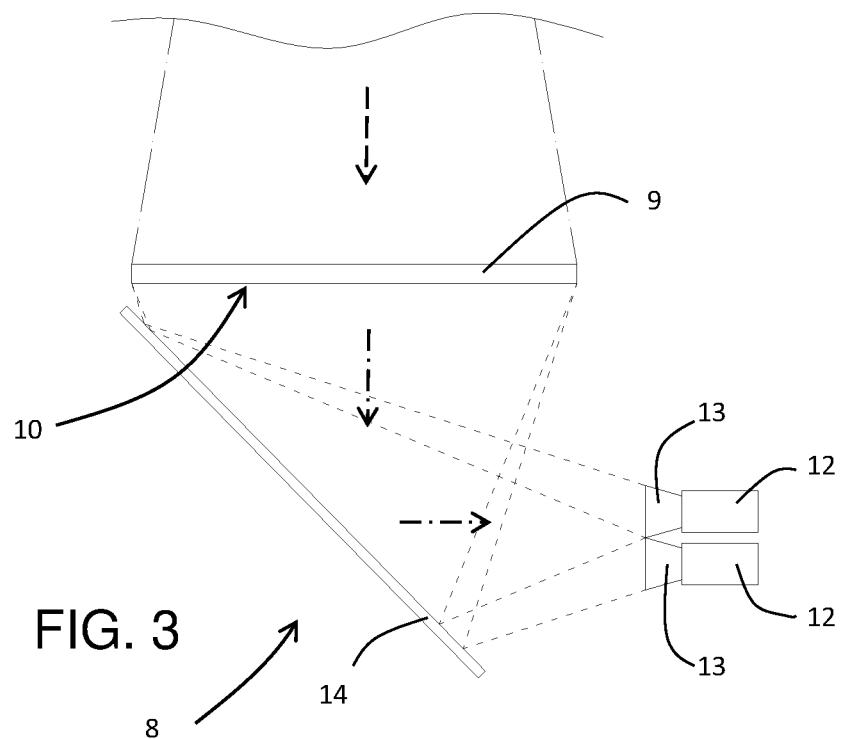
FIG. 3 is a schematic view of a first embodiment of an X-ray detector which is part of the tomographic scanner according to this invention.
Figure 4:
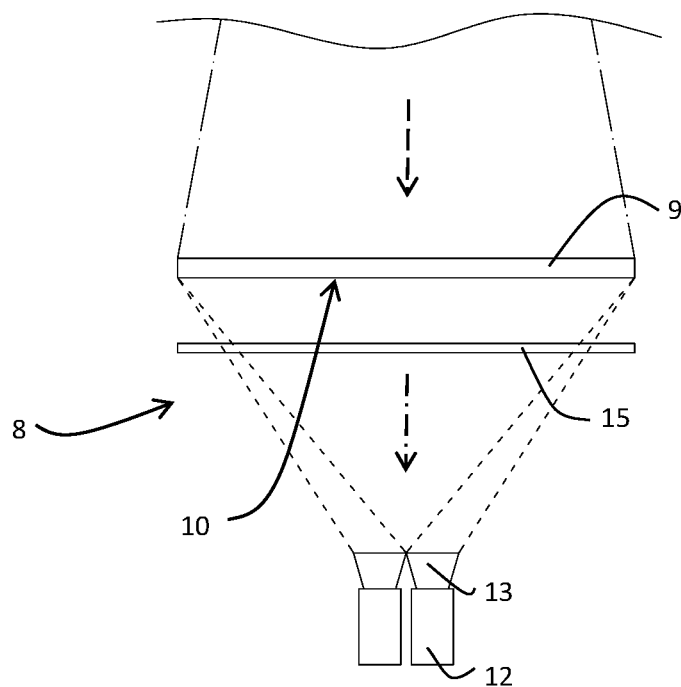
FIG. 4 is a schematic view of a second embodiment of an X-ray detector which is part of the tomographic scanner according to this invention.

In general, the emission face 10 may face either towards the X-ray emitter 7 (FIG. 5), or the opposite way (FIGS. 3 and 4). Whilst the latter is the solution normally adopted in prior art tomographic scanners, the former solution, in which the emission face 10 coincides with the face through which the X-rays strike the scintillator 9, has been devised considering the fact that most scintillator materials are only partly transparent to visible light, with the consequence that they can only be made with limited thicknesses in order to reduce the risk that the light produced by the interaction of the X-rays with the scintillator 9 is absorbed by the scintillator 9 itself. At the same time, thicknesses which are too small do not allow interception of a significant percentage of incident X-rays. The solution which involves using the light emitted by the scintillator 9 on the same side as the source of the X-rays (FIG. 5), increases the efficiency of the system, because most of the X-photons are intercepted by the first layers of scintillator 9 material and must go through less scintillator 9 before coming out of the emission face 10 (remember that the visible light photons are emitted in all directions). Some tests carried out by the Applicant have demonstrated that in this way it is possible to obtain almost double the intensity of usable light, other conditions being equal.

However, depending on the embodiments there may be only one emission face 10 which is placed on only one side of the scintillator 9 or two emission faces 10 which are placed on two opposite sides of the scintillator 9 (that is to say, on the two sides of each of its cells). In particular, in a more complex embodiment (FIG. 6), the scintillator 9 comprises two flat scintillator bodies 11, which are coupled to each other parallel to the respective planes of extension, and which each define an emission face 10. In particular, the two emission faces 10 are facing one towards the X-ray emitter 7 and the other in the opposite direction. Each scintillator body 11 has the same division into cells as the scintillator 9 as a whole, and the two scintillator bodies 11 are coupled to each other in such a way that the corresponding cells are aligned with each other.

In this way, by detecting the light emitted by both faces, it is possible to obtain two specular images of the same object 6. The image created by observing the emission face 10 facing the opposite way to the X-ray emitter 7 will be formed mainly by X-photons having higher energy, since those having lower energy will generally be stopped by the scintillator body 11 placed on the same side as the X-ray emitter 7. In some embodiments it is also possible render the electromagnetic spectra of X-photons detected even more differentiated, by interposing a sheet of X-ray filtering material (e.g.; aluminium or copper) between the two scintillator bodies 11. The principle of using two images based on X-photons having different energy, is the same used in "dual energy" sensors, and allows improved differentiation of the composition of the materials measured.

According to the main innovative aspect of this invention, the X-ray detector 8 also comprises a plurality of video cameras 12 which are connected to the electronic processing unit. Each video camera 12 comprises an acquisition sensor (not illustrated) and a photographic lens 13 which is optically coupled to the acquisition sensor. The photographic lens 13 is focused (or focusable) on the emission face 10 of the scintillator 9 which the video camera 12 must observe (preferably the photographic lens 13 has an optical axis positioned perpendicularly to the emission face 10).

Advantageously, according to the known technology for video cameras 12, the acquisition sensor is a CCD or CMOS sensor, although other types, even new generation, may be used depending on requirements. The CCD or CMOS sensors usually used in the video cameras 12 are able to acquire data from millions of pixels at very high acquisition frequencies. At the same time, although the sensors of this type can perform this operation efficiently, their surface is very small compared with the size that must be covered in order to make a tomographic scanner 1 (that is to say, compared with the surface of the scintillator 9). However, a video camera 12 equipped with a lens which frames in the viewfinder the scintillator 9 from a suitable distance can also frame a rather large zone and make up for that difference in size.

Therefore, each video camera 12 is positioned in such a way as to frame at least one portion of the scintillator 9 at the emission face 10 (or at one of the emission faces 10). Specifically, each video camera 12 is used for acquiring one after another images in the visible spectrum, of the zone of the emission face 10 which corresponds to the specific portion of the scintillator 9. In the context of this invention, the individual images acquired by each video camera 12 will be defined as operating image or second image. Advantageously, the operating images are acquired every time the rotor 3 is in an angular position for which processing of a main image is required.

Also according to the main innovative aspect of this invention, each portion of the scintillator 9 is framed by at least two separate video cameras 12, in such a way as to collect, for each portion of scintillator 9, a greater quantity of photons than could be achieved with a single video camera 12. In fact, by collecting the visible light emitted by the scintillator 9 by means of a lens placed some distance away, rather than by means of a direct coupling as in the current solutions which use photodiodes, there is the disadvantage that most of the light photons coming out of the scintillator 9 do not go towards the lens, and are therefore dispersed. This makes the signal detectable with the video camera 12 very weak and therefore reduces the signal-to-interference ratio.

At least in industry, in order to increase the intensity of the signal detectable with the video cameras 12 other devices may also be used, such as the use of X-ray emitters with higher power and voltage than prior art tomographic scanners, using video cameras 12 with high gain and low noise, using video cameras 12 which are cooled in order to reduce the effect of the thermal noise or coupling one or more lenses to the emission face 10, for focusing the light emitted by the emission face 10 in the video cameras 12.

Furthermore, it is also possible to use lenses with a very open diaphragm in such a way as to collect more light (for example, with diaphragm aperture values of less than f/1, such as f/0.95). It should be noticed that these lenses have a very narrow depth of field, but that is not a problem, provided that the part of the emission face 10 framed is flat and orthogonal to the optical axis of the lens of the video camera 12. In fact, in this way, the depth of field necessary could even be null.

Figure 6:
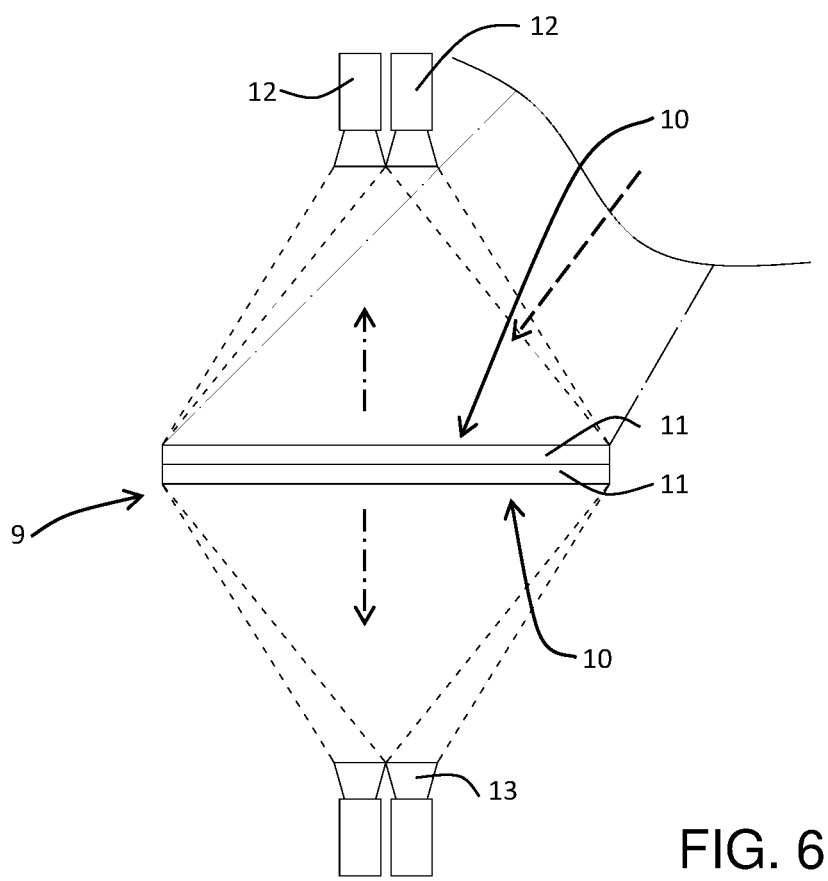
FIG. 6 is a schematic view of a fourth embodiment of an X-ray detector which is part of the tomographic scanner according to this invention.

It should be noticed that, if there is only one emission face 10, the same portion of scintillator 9 may be framed multiple times by framing multiple times the same zone of the emission face 10, whilst if there are two opposite emission faces 10 (FIG. 6) the same portion of scintillator 9 may be framed twice even using two video cameras 12 which frame it, one at one emission face 10, the other at the other emission face 10 (in FIG. 6 each portion is framed four times, by two video cameras 12 at one emission face 10 and two video cameras 12 at the other emission face 10).

In turn, the electronic processing unit is programmed to obtain each first image by combining all of the second images obtained by the video cameras 12, and in particular, advantageously, alternatively either adding together, or taking an average of, the plurality of second images which the different video cameras 12 acquire for each portion of the scintillator 9.

Thanks to the fact that the image to be detected is generated on the plane of the scintillator 9, it is possible to acquire the image with video cameras 12 positioned at different points without there being any possible ambiguity. In fact, the quantity of light sent in the various directions by the scintillator 9 may be different, but it will always be proportionate to the number of X-photons which strike each cell of the scintillator 9. The detections by the video cameras 12 can therefore easily be equalised by acquiring with each video camera 12 a "no-load" image, that is to say, without an object 6 in the detecting zone 4 (or with only permanently present objects 6 such as the conveying device 5) and then considering as attenuation the ratio of the signal measured to that acquired with no load.

From a geometric viewpoint, if multiple video cameras 12 are used to acquire images of superposed zones, an initial calibration is necessary which allows the correct association between the pixels of the images acquired by each video camera 12 (and, therefore, correct association with the correct cell of the scintillator 9). This may be done, for example, in two steps: (a) by acquiring an image of a chessboard or other pattern placed over the scintillator 9, to allow application of the typical procedures for calibration of a video camera 12 which allow unique mapping of each pixel to a point of the plane; (b) by scanning an object 6 (e.g.: a group of steel spheres having known diameter—for example 1 mm—which are arranged in known positions relative to one another) optimising the system geometric parameters in such a way as to ensure that the reconstruction obtained by the combination of the signals of all of the video cameras 12 supplies the most precise spheres possible, or, equivalently, ensuring that the backprojections of the spheres identified in the image of each video camera 12, converge at the same point in space.

Depending on the embodiments, each video camera 12 may frame either the entire emission face 10 (FIGS. 3, 4 and 6) or only part of it (FIG. 5 in which the emission face 10 is constituted of two parts which are at an angle to each other).

In the preferred embodiments, in order to facilitate the subsequent tomographic reconstruction operations, the electronic processing unit is advantageously programmed to combine the second images in such a way as to obtain a first image which corresponds to an image of the entire emission face 10 which could be obtained by using a single sensor with prior art features. Given the images received from the various video cameras 12, in order to proceed with tomographic inversion it is in fact preferable to create a virtual image, as if it had been acquired by a single virtual sensor. The definition of the parameters of the virtual sensor to be recreated (curved or flat, resolution, extent) may be arbitrary, but it is preferable that they are as similar as possible to what is measured by the video cameras 12. Bearing in mind that, in some known tomographic inversion algorithms, like that proposed by Katsevich (Katsevich, Alexander. "Theoretically exact filtered backprojection-type inversion algorithm for spiral CT", SIAM Journal on Applied Mathematics 62.6 (2002): 2012-2026), one of the first operations necessary is "forward height rebinning" requiring calculation of the value which a sensor would have read if it were placed along several special curves, it may be advantageous that the pixels of the virtual sensor being recreated during first image generation, coincide with those necessary at the first step of the algorithm.

As for prior art tomographic scanners, also for the one 6 according to this invention, there are means for determining the angular position of the rotor 3 around the axis of rotation, at the moment when the second images are acquired (in fact, the tomographic reconstruction is only possible with precise knowledge of the angular position referred to by each first image obtained). Without going into detail concerning the prior art means for determining the angular position (which are based on a precise movement of the rotor 3), in an innovative embodiment of this invention the means for determining the angular position of the rotor 3 are constituted of the electronic processing unit, which is also programmed to determine the angular position, processing the first images as a function of the known position of one or more fixed reference elements which are present at the detecting zone 4. This embodiment is particularly useful when using video cameras 12 which do not have digital inputs for obtaining information about the angular position. The solution proposed consists of using, for calculating the angular position, the image produced on the scintillator 9 (and therefore in the first image) by several known features of the detecting zone 4, in particular by the conveying system. For example, it is possible to use a supporting surface which may be present for a conveyor belt of the conveying device 5 for conveying objects 6: it defines a plane which creates a very sharp light/dark edge in the image when it is aligned with the X-rays. By observing the gradient over time of the image produced by those reference elements, it is possible to estimate the frame in which the plane aligns with the rays with a precision equal to at least $\frac{1}{10}$ of a frame (for example, by calculating the maximum point of a parabola on the gradient/frame graph).

Relative to this method for determining the angular position of the rotor 3 the Applicant reserves the right to proceed with independent protection even by filing divisional applications.

The communication system between the rotor 3 which rotates at relatively high speeds, and the static part of the system (supporting structure 2) is potentially complicated, expensive and not able to offer a very high data communication band. Therefore, it is advantageous for the electronic processing unit to be split into two or more main units, which are programmed to carry out separate processing divided between the stator part and the rotor 3. In particular, there may be one or more rotor main units present, which are mounted on the rotor 3, and connected directly to the video cameras 12, and one or more stator main units which are stationary relative to the rotation of the rotor 3. In particular, it may be advantageous for a rotor main unit to be present directly inside one or more video cameras 12. As illustrated in FIG. 3, in some embodiments in which the emission face 10 is positioned on the opposite side to the X-ray emitter 7, the X-ray detector 8 also comprises an angled mirror 14 and/or a protective shield 15 for protecting against the X-rays (for example, lead glass) placed along an optical path extending from the emission face 10 to the video cameras 12.

In fact, most of the X-photons which strike the scintillator 9, are not converted into light, continuing on their path. If the video cameras 12 were placed directly behind the scintillator 9, they could be damaged. Interposing a protective shield 15, or an angled mirror 14 (relative to the direction of the X-rays), or both, allows this problem to be avoided. By using the angled mirror 14 it is possible to position the video cameras 12 in a lateral position where it is much easier to shield them. The positioning of an angled mirror 14 also allows the distance between the video cameras 12 and the centre of rotation to be limited. This is important because the centrifugal force to which the video cameras 12 and everything associated with them (lenses, cables, connectors, supports, shielding) are subjected is linearly dependent on the distance from the centre of rotation, the speed being the same. The greater the centrifugal force which can be generated is, the greater the need to use strong (expensive) components is, and the more complex the design becomes.

Otherwise, in the case of the solution in which the video camera 12 observes the emission face 10 facing the X-ray emitter 7, there is no need for the mirror or the shield, since the video camera 12 can simply be positioned laterally (FIG. 5) in order to prevent it being struck by the direct beam of X-rays, and given that the position of the video camera 12 in any case would not be too far from the centre of rotation.

Also with the aim of increasing the sensitivity of the video cameras 12, in some embodiments in at least one video camera 12 the detecting pixels (each video camera 12 comprises a plurality of detecting pixels—numbering in the millions) are grouped in a plurality of groups each comprising at least two pixels, and the detections of the pixels of each group are unified in a single reading. In this way, it is possible to virtually increase the size of each individual output pixel, therefore collecting more photons. By way of example, the pixels may be grouped on the basis of a square pattern with sides 2×2, 3×3, 4×4, . . . N×N. Technically that may be done inside the video camera 12 itself by means of binning, or via software on the computer for processing the images. By dividing the zone to be framed (the emission face 10) into sub-zones each covered by two or more video cameras 12, it is possible to also cover a large zone with high resolution, even if each video camera 12 supplies an output with few virtual pixels each of which corresponds to many unified real pixels.

Moving on to the method for acquiring images from a scintillator 9 of a tunnel computerised tomographic scanner 1, it comprises several operating steps which are carried out in the X-ray detector 8 described above from a structural viewpoint. If applicable, what is described with reference to the tomographic scanner 1 must also be considered valid for the method and vice versa.

First, the method comprises a step in which, for each portion of the scintillator 9 whose image must be acquired, the same zone of a emission face 10 is framed with at least two separate video cameras 12, and subsequently a step in which, with each video camera 12 framing each zone of a emission face of the scintillator 9, an second image of the zone is generated.

Then, there is a step in which, by means of an electronic processing unit, the second images obtained for the various portions of the scintillator 9 are combined to obtain a single first image which is representative of the entire scintillator 9.

In the preferred embodiment, the step of combining the second images comprises, for each zone of a emission face 10 of the scintillator 9, alternatively either the operating step of adding together the second images relative to that zone, or the operating step of taking an average of the second images relative to that zone.

This invention brings important advantages.

In fact, thanks to this invention, it has been possible to provide a tunnel computerised tomographic scanner 1, and a method for acquiring images from a scintillator 9 of a tunnel computerised tomographic scanner 1, which use a large acquisition surface, with an acquisition frequency equal to prior art multi-line systems and a cost lower than the prior art ones.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A tunnel computerised tomographic scanner comprising:
   a supporting structure (2);
   a rotor (3) supported by the supporting structure (2) and rotatable relative to the supporting structure (2) about an axis of rotation, the rotor (3) surrounding a detecting zone (4) through which the axis of rotation passes;
   a motor connected to the rotor (3) for driving its rotation about the axis of rotation;
   an X-ray emitter (7) mounted on the rotor (3);
   an X-ray detector (8) mounted on the rotor (3), on an opposite side of the detecting zone (4) relative to the X-ray emitter (7), the X-ray detector (8) comprising at least one scintillator (9) which has at least one emission face (10) from which the scintillator (9) emits light in the visible spectrum when it is struck by X-rays;
   an electronic processor connected to the X-ray detector (8) and programmed to combine first images acquired by the X-ray detector (8), in a plurality of separate angular positions of the rotor (3) around the axis of rotation, for reconstructing a three-dimensional structure of an object (6) placed in the detecting zone (4); wherein:

the X-ray detector (8) also comprises a plurality of video cameras (12) which are connected to the electronic processor, each video camera (12) being positioned in such a way as to frame at least one portion of the scintillator (9), for acquiring, in each of said separate angular positions of the rotor (3), second images, in the visible spectrum, of the respective portion of the scintillator (9);

at least two separate video cameras (12) of said plurality of video cameras substantially frame each zone of the at least one emission face (10) of the scintillator (9), and the electronic processor is programmed to obtain each first image by combining all of the second images obtained by the video cameras (12).

2. The tunnel computerised tomographic scanner according to claim 1, wherein the electronic processor is programmed to obtain each first image alternatively either by adding together, or by taking an average of, the plurality of second images obtained by the different video cameras (12) for each zone of the at least one emission face (10) of the scintillator (9).

3. The tunnel computerised tomographic scanner according to claim 1, wherein the electronic processor is also programmed to combine the second images in order to obtain a first image which corresponds to an image of the entire emission face (10) which could be obtained by using a single sensor with known characteristics.

4. The tunnel computerised tomographic scanner according to claim 1 wherein there are also means present for determining the angular position of the rotor (3) about the axis of rotation at the moment when the second images are acquired.

5. The tunnel computerised tomographic scanner according to claim 4, wherein the means for determining the angular position of the rotor (3) are constituted of the electronic processor which is programmed to determine the angular position by processing the first images as a function of the known position of one or more fixed reference elements which are present at the detecting zone (4).

6. The tunnel computerised tomographic scanner according to claim 1, wherein the electronic processor is split into two or more main units, which are programmed to carry out separate processing, one or more rotor main units which are mounted on the rotor (3) and connected directly to the video cameras (12) and one or more stator main units which are stationary relative to the rotation of the rotor (3).

7. The tunnel computerised tomographic scanner according to claim 1, wherein each video camera (12) comprises an acquisition sensor and a photographic lens (13) optically coupled to the acquisition sensor, the photographic lens (13) being focused or focusable on the emission face (10) of the scintillator (9).

8. The tunnel computerised tomographic scanner according to claim 7, wherein the acquisition sensor is a CCD or CMOS sensor.

9. The tunnel computerised tomographic scanner according to claim 7 wherein the emission face (10) of the scintillator (9) is flat and the photographic lens (13) has an optical axis positioned perpendicularly to the emission face (10).

10. The tunnel computerised tomographic scanner according to claim 1 wherein the X-ray detector (8) also comprises an angled mirror (14) and/or a protective shield (15) for protecting against the X-rays which is placed along an optical path extending from the main face to one or more of the video cameras (12).

11. The tunnel computerised tomographic scanner according to claim 1 wherein each video camera (12) comprises a plurality of detecting pixels and wherein, in at least one video camera (12), the detecting pixels are grouped in a plurality of groups each comprising at least two pixels, and wherein the detections of the pixels of each group are unified in a single reading.

12. The tunnel computerised tomographic scanner according to claim 1 wherein the X-ray detector (8) also comprises one or more lenses coupled to the emission face (10) for focusing the light emitted by the emission face (10) in the video cameras (12).

13. The tunnel computerised tomographic scanner according to claim 1, wherein the video cameras (12) are cooled.

14. The tunnel computerised tomographic scanner according to claim 1, wherein the emission face (10) of the scintillator (9) is facing the X-ray emitter (7).

15. The tunnel computerised tomographic scanner according to claim 1, wherein the scintillator (9) comprises two coupled flat scintillator bodies (11) which each define an emission face (10), the two emission faces (10) facing one towards the X-ray emitter (7) and the other the opposite way, wherein at least two separate video cameras (12) frame each zone of each emission face (10), and wherein the electronic processor is programmed to obtain each first image, by combining all of the second images obtained by the video cameras (12).

16. The tunnel computerised tomographic scanner according to claim 15, wherein the video cameras (12) of a first group of said plurality of video cameras (12) are positioned in such a way that each of them frames at least one zone of one emission face (10), and the video cameras (12) of a second group of said plurality of video cameras (12) are positioned in such a way that each of them frames at least one zone of the other emission face (10).

17. The tunnel computerised tomographic scanner according to claim 1, also comprising a conveying device (5) for conveying objects (6) which is mounted through the detecting zone (4) for feeding an object (6) parallel to the axis of rotation during rotation of the rotor (3) about the axis of rotation.

18. A method for acquiring images from a scintillator (9) of a tunnel computerised tomographic scanner (1), wherein an emission face (10) of the scintillator (9) emits light in the visible spectrum when the scintillator (9) is struck by X-rays, the method comprising the operating steps of:

for substantially each zone of the emission face (10) of the scintillator (9) for which an image must be acquired, framing that zone with at least two separate video cameras (12);

with each video camera (12) which frames each zone of the emission face (10) of the scintillator (9) generating a second image of the zone;

by means of an electronic processor combining the second images in order to obtain a single first image which is representative of the entire scintillator (9).

19. The method according to claim 18 wherein the step of combining the second images comprises, for each zone of the emission face (10) of the scintillator (9), alternatively either the operating step of adding together the second images relative to that zone, or the operating step of taking an average of the second images relative to that zone.

* * * * *